Nov. 29, 1949 K. T. BUTTERY 2,489,616
CONTAINER
Filed Aug. 2, 1946
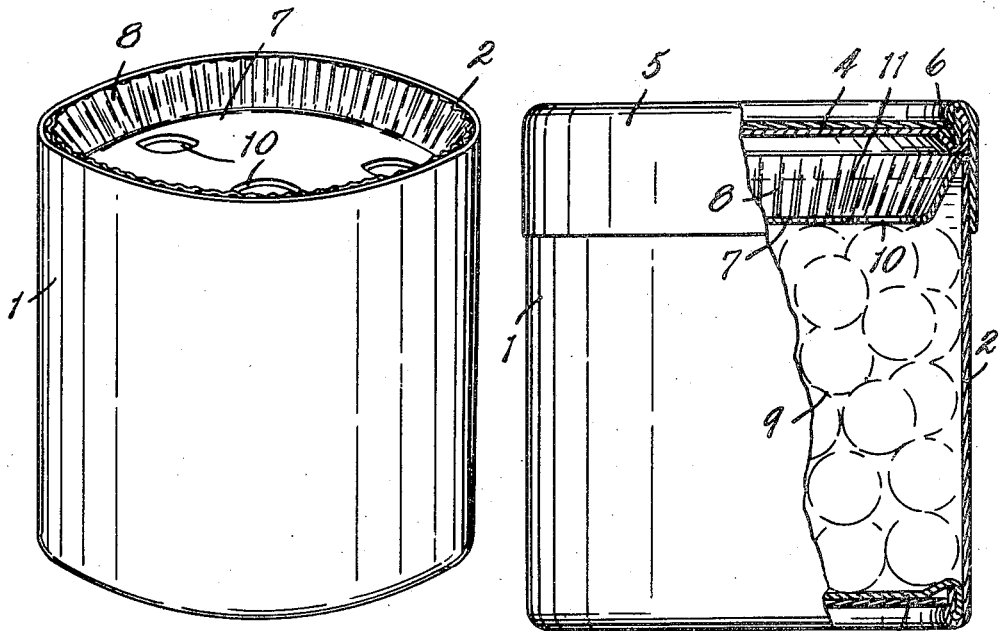
FIG.1
FIG.2
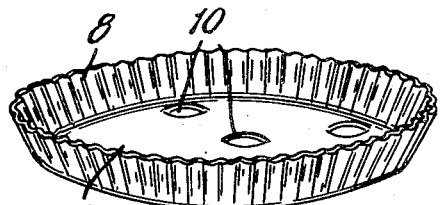
FIG.3
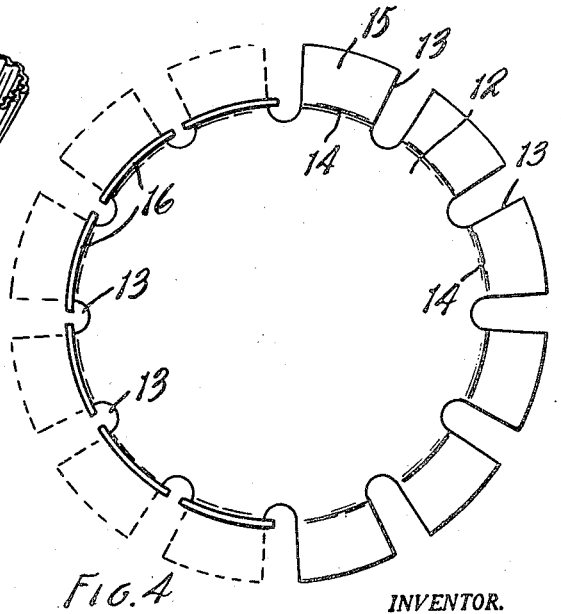
FIG.4
INVENTOR.
Kenneth T. Buttery
BY
Attorney.

Patented Nov. 29, 1949

2,489,616

UNITED STATES PATENT OFFICE 2,489,616

CONTAINER

Kenneth T. Buttery, Kalamazoo, Mich., assignor to Sutherland Paper Company, Kalamazoo, Mich., a corporation of Michigan Application August 2, 1946, Serial No. 688,131

6 Claims. (Cl. 229—5.5)

This invention relates to improvements in container.

The main objects of this invention are:

First, to provide a container formed of fibrous material which is well adapted for use in the packaging and freezing processing of food products, such as fruits for example.

Second, to provide a container for this purpose in which the product processed is depressed within the container to insure complete coverage thereof with the syrup or liquid employed.

Third, to provide a depressor which may be formed of fibrous sheet stock such as container board or the like and is easily and quickly inserted or applied to the container.

Further objects relating to details and economies of the invention will appear from the description to follow. The invention is defined and pointed out in the claims.

A structure which embodies the features of the invention is illustrated in the accompanying drawing, in which:

Fig. 1 is a perspective view of a container embodying the features of the invention with the cover removed.

Fig. 2 is a fragmentary side elevational view partially in vertical section with the parts completely assembled, the contents packaged being conventionally illustrated, the liquid level being indicated by the transverse dotted line.

Fig. 3 is a perspective view of the depressor illustrated in Figs. 1 and 2.

Fig. 4 is a plan view on a modified form of depressor with a part of the segmental rim members shown in upstanding position by full lines and in extended position by dotted lines, the remaining segmental rim members being shown in extended position by full lines.

In the embodiment of the invention illustrated, the container designated generally by the numeral 1 comprises the cylindrical body member 2 having a bottom designated generally by the numeral 3 secured therein by a suitable seaming joint. This detail, however, forms no part of the present invention.

The cover 4 is provided with a downturned flange 5 telescopingly embracing the body member, the cover having an internal annular shoulder 6 adapted to engage the edge of the side wall of the body as shown in Fig. 2 and to project inwardly therefrom for a purpose which will be pointed out. The cover is also formed of fibrous material.

The depressor 7 is provided with an upwardly and outwardly flaring rim 8 vertically corrugated to yieldingly fit within the container as is shown in Figs. 1 and 2 and to provide an edge of substantial width engageable with the shoulder 6 of the cover.

In the packing of fruit and other food products by a freezing method it is quite common practice to utilize syrup or a liquid. It is desirable that the material frozen or processed, such as is indicated conventionally at 9, be entirely submerged in the liquid. The depressor member serves to hold the fruit wholly submerged in the liquid, the depressor having openings such as the holes 10 in the bottom of the depressor through which the fluid may pass above the bottom of the depressor and consequently above the objects 9, a liquid level being indicated at 11.

With the parts arranged as shown in Fig. 2 the package is ready for the freezing step and it is contemplated that it will be frozen solid. By the use of the depressor the complete submerging of the fruit or other material packaged is assured.

In Fig. 4 is illustrated a modified form or embodiment of a depressor designated by the number 12, this being formed of a disk of fibrous material having annularly spaced radially disposed slots 13 therein of substantial width and having hinge scores 14, the slots extending inwardly beyond the scores. When this form of depressor is inserted within the container, the segmental rim portions 15 are turned upwardly to the positions shown at 16 to be engaged by the cover, the inner ends of the slots providing openings through which the liquid may flow.

While in the embodiment shown in Figs. 1, 2, and 3, a plurality of openings 10 are provided and this is a desirable feature, a single opening would serve the purpose, but in using a single opening it would be necessary to insert the depressor with care so as not to force the liquid through the depressor as a jet or cause it to overflow between the edge of the depressor and the wall of the container.

The structure is simple and economical to produce and is highly satisfactory for the purpose for which it is designed. It will be understood that I have adopted and used the term depressor somewhat arbitrarily, but it is adopted because its function is to depress or hold down the objects in the container so that they are completely covered by the liquid.

I have not attempted to illustrate or describe other embodiments or adaptations of the invention as it is contemplated, as it is believed that this disclosure will enable those skilled in the art to adapt or embody the invention as may be desired.

Having thus described the invention, what is claimed as new and desired to secure by Letters Patent is:

1. The combination of a container for holding liquids comprising a body and cover therefor, the cover being provided with a flange adapted to telescopingly engage the body and with an annular shoulder within the flange adapted to engage the edge of the body and to extend inwardly therefrom, and a dished depressor member of fibrous material having a central body portion and a corrugated outwardly flaring rim, the rim yieldingly fitting within the container wall and engageable by said shoulder on the cover when the cover is in closed position for holding said central body portion and the objects beneath the same in spaced relation from the cover and below the level of the liquid in the container, the bottom of the depressor having openings therein for the passage of liquid therethrough.

2. The combination with a container for holding liquids provided with a cover having a flange adapted to telescopingly engage the body and an annular shoulder within the flange adapted to engage the edge of the body and to extend inwardly therefrom, of a depressor member having a central body portion and a corrugated upwardly projecting rim yieldingly fitting within the container wall and adapted to be engaged by said shoulder on the cover when the cover is in closed position for holding said central body portion and the objects beneath the same in spaced relation from the cover and below the level of the liquid in the container, the depressor having openings therein for the passage of liquid therethrough.

3. The combination with a container for holding liquids and cover therefor both of fibrous material, of a depressor member of fibrous material having a central body portion and an upwardly projecting peripheral cover engaging means yieldingly engaged within the container wall, the depressor having openings therein for the passage of liquid therethrough, said upwardly projecting peripheral cover engaging means being engaged by the cover when in closed position to hold the central body portion and the objects beneath the same in spaced relation from the cover and below the level of the liquid in the container.

4. The combination with a container for holding liquids and cover therefor, of a depressor member of fibrous material having an annular score in spaced relation to its edge and a plurality of annularly spaced slots extending inwardly beyond the score providing a plurality of segmental rim parts whereby the depressor member may be arranged within the container with its segmental rim parts projecting upwardly to be engaged by the cover to hold the depressor in substantially spaced relation to the cover and to hold objects beneath the depressor member below the level of the liquid in the container when the cover is in closed position, the inner ends of said slots providing openings for the passage of liquid.

5. The combination with a container for holding liquids and cover therefor, of a depressor member having a part thereof projecting upwardly into engagement with the cover to hold the depressor in substantially spaced relation to the cover and to hold objects beneath the depressor below the level of the liquid in the container when the cover is in closed position, the depressor having an opening therein for the passage of liquid therethrough, the opening being of such dimension as to prevent the passage of the objects depressed.

6. The combination of a container for holding liquids and a cover therefor, a depressor having a central body portion disposed in spaced relation from said cover when said cover is closed to provide a space for liquid in said container above said central body portion, said cover including means engageable with said depressor to hold the central body portion thereof below the level of the liquid in the container when the cover is closed, said depressor having an opening therein to permit passage of fluid therethrough.

KENNETH T. BUTTERY.

REFERENCES CITED

The following references are of record in the file of this patent:

UNITED STATES PATENTS

| Number | Name | Date |
| --- | --- | --- |
| 1,586,898 | Haslacher | June 1, 1926 |
| 1,608,422 | Plass | Nov. 23, 1926 |
| 1,927,435 | Derst | Sept. 19, 1933 |
| 2,110,612 | Skinner et al. | Mar. 8, 1938 |
| 2,284,499 | Van Saun | May 26, 1942 |
| 2,340,473 | Johnson | Feb. 1, 1944 |